US009796345B2

(12) United States Patent
Takahashi et al.

(10) Patent No.: US 9,796,345 B2
(45) Date of Patent: Oct. 24, 2017

(54) CLIP AND CONNECTING STRUCTURE USING CLIP

(71) Applicants: HONDA MOTOR CO., LTD., Tokyo (JP); NIFCO INC., Kanagawa (JP)

(72) Inventors: Koji Takahashi, Wako (JP); Minoru Hasegawa, Wako (JP); Toru Koga, Yokosuka (JP)

(73) Assignees: HONDA MOTOR CO., LTD., Tokyo (JP); NIFCO, INC., Kanagawa (JP)

( * ) Notice: Subject to any disclaimer, the term of this patent is extended or adjusted under 35 U.S.C. 154(b) by 0 days.

(21) Appl. No.: 15/221,643

(22) Filed: Jul. 28, 2016

(65) Prior Publication Data

US 2017/0028939 A1 Feb. 2, 2017

(30) Foreign Application Priority Data

Jul. 29, 2015 (JP) ................................. 2015-149469

(51) Int. Cl.
*B60R 13/04* (2006.01)
*F16B 2/22* (2006.01)
*B60R 19/24* (2006.01)

(52) U.S. Cl.
CPC ............. *B60R 13/04* (2013.01); *B60R 19/24* (2013.01); *F16B 2/22* (2013.01); *B60R 2019/247* (2013.01)

(58) Field of Classification Search
CPC ... B60R 13/04; B60R 19/24; B60R 2019/247; F16B 2/22
See application file for complete search history.

(56) References Cited

U.S. PATENT DOCUMENTS

| 1,893,229 | A | * | 1/1933 | Crabtree | ................... F16F 1/26 267/53 |
| 4,043,579 | A | * | 8/1977 | Meyer | ..................... B60R 19/44 24/293 |
| 5,347,691 | A | * | 9/1994 | Terazoe | ............. B60R 13/0206 24/289 |
| 5,407,310 | A | * | 4/1995 | Kassouni | ............... B29C 70/76 29/525.02 |

(Continued)

FOREIGN PATENT DOCUMENTS

JP 0640033 10/1994
JP 09118271 A 5/1997

*Primary Examiner* — Robert Sandy
*Assistant Examiner* — David M Upchurch
(74) *Attorney, Agent, or Firm* — Armstrong Teasdale LLP

(57) ABSTRACT

Provided is a clip that does not require a through hole to be formed in one of the two component parts that are to be connected, and is provided with a small thickness so that the spacing between the two component parts may be minimized. The clip includes a first part including a plate-shaped first base and a first engagement piece projecting from a surface of the first base, a free end part of the first engagement piece being formed with an engagement projection; and a second part including a plate-shaped second base and a second engagement piece projecting from a surface of the second base, a free end part of the second engagement piece being formed with an overhang portion configured to cooperate with the engagement projection; wherein a receiving hole is formed at least in one of the first base and the second base, and is configured to receive at least a part of the engagement piece projecting from the other of the first base and the second base.

14 Claims, 10 Drawing Sheets

(56) References Cited

U.S. PATENT DOCUMENTS

| | | | | |
|---|---|---|---|---|
| 5,838,534 A * | 11/1998 | Yang | ............... | F16B 37/14 |
| | | | | 24/113 MP |
| 5,862,917 A * | 1/1999 | Noble | ............... | B65D 19/18 |
| | | | | 206/600 |
| 6,381,886 B1 * | 5/2002 | Chou | ............... | G09F 7/00 |
| | | | | 24/341 |
| 7,338,068 B2 * | 3/2008 | Kawai | ............... | B60R 21/215 |
| | | | | 24/297 |
| 2005/0155191 A1 * | 7/2005 | Asano | ............... | B60R 13/0206 |
| | | | | 24/297 |
| 2006/0201980 A1 * | 9/2006 | Koons | ............... | B60D 1/07 |
| | | | | 224/511 |
| 2009/0110507 A1 * | 4/2009 | Katoh | ............... | B60R 13/0206 |
| | | | | 411/80.1 |
| 2010/0252705 A1 * | 10/2010 | Shinomiya | ............... | F16B 21/16 |
| | | | | 248/231.21 |
| 2011/0197405 A1 * | 8/2011 | Kato | ............... | F16B 21/065 |
| | | | | 24/530 |
| 2012/0223207 A1 * | 9/2012 | Hattori | ............... | B29C 45/006 |
| | | | | 248/346.03 |
| 2014/0265455 A1 * | 9/2014 | Fulton | ............... | B60R 13/04 |
| | | | | 296/210 |
| 2015/0132422 A1 * | 5/2015 | Yamada | ............... | B29C 31/008 |
| | | | | 425/3 |

* cited by examiner

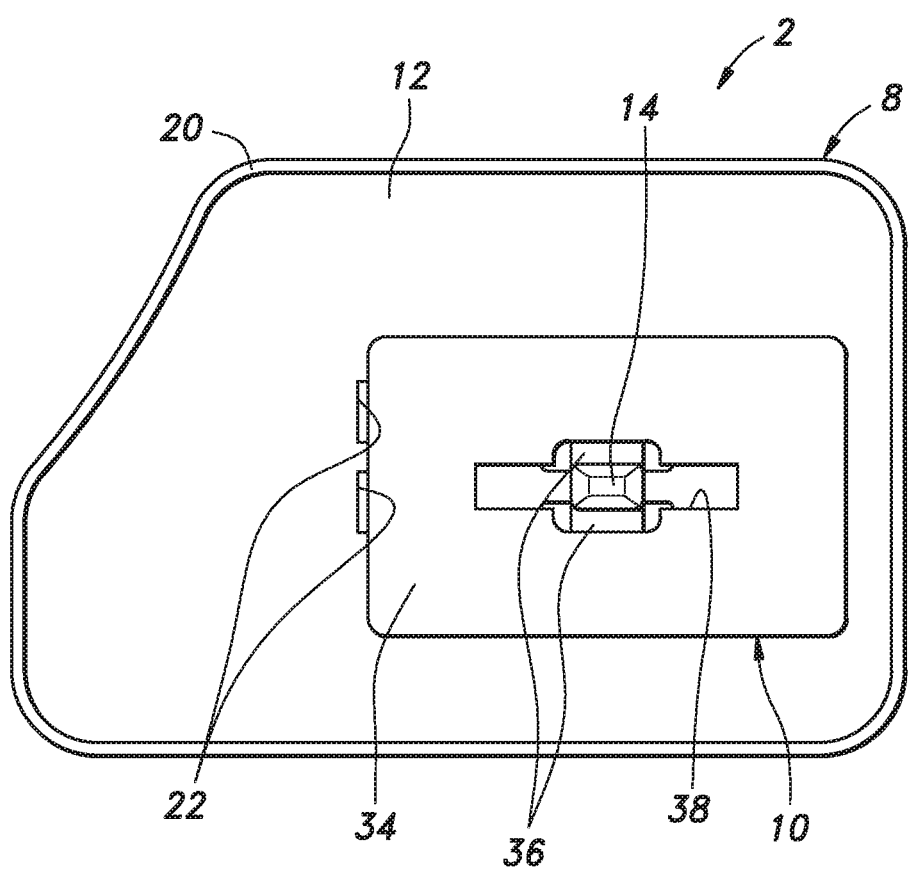

CLIP AND CONNECTING STRUCTURE USING CLIP

TECHNICAL FIELD

The present invention relates to a clip for connecting two component parts with each other and a connecting structure using such a clip, and in particular to a low profile clip and a connecting structure using such a clip.

BACKGROUND ART

A clip is often used for connecting two component parts with each other. For instance, JPH09-118271A discloses a structure where one of two component parts is formed with a through hole, and the other component part is formed with a hook shaped clip. In this structure, the two component parts are connected to each other by engaging the clip in the through hole. A lateral end part of the through hole is wider than the remaining part of the through hole so that the two component parts can be disconnected from each other by sliding the clip laterally to the wider part of the through hole.

JPH06-40033Y2 discloses a structure where two component parts are connected to each other by fixing a T-shaped stud to one of the component parts by using double-sided tape, and engaging a clip to both the T-shaped stud and the other component part. According to this structure, the two component parts can be disconnected from each other by sliding the clip laterally.

SUMMARY OF THE INVENTION

Task to be Accomplished by the Invention

In the case of the clip disclosed in JPH09-118271A, one of the component parts is required to have a through hole, but depending on the application, such a through hole may not be formed in one of the component parts when water proofing is required. In the case of the clip disclosed in JPH06-40033Y2, the T-shaped stud is welded to one of the component parts, and no through hole is required to be formed in either component part. However, a certain spacing for accommodating the thickness of the clip is required to be created between the two component parts so that a large spacing is required between the two component parts than in the case of the clip disclosed in JPH09-118271A.

The present invention was made in view such problems of the prior art, and has a primary object to provide a clip which does not require a through hole to be formed in one of the two component parts that are to be connected, and is provided with a small thickness so that the spacing between the two component parts may be minimized.

Means for Accomplishing the Task

To achieve such an object, the present invention provides a clip (2, 52), comprising; a first part (8, 54) including a plate-shaped first base (12, 58) and a first engagement piece (14, 60) projecting from a surface of the first base, a free end part of the first engagement piece being formed with a first engagement feature (26, 72); and a second part (10, 56) including a plate-shaped second base (34, 74) and a second engagement piece (36, 76) projecting from a surface of the second base, a free end part of the second engagement piece being formed with a second engagement feature (42, 80) configured to cooperate with the first engagement feature; wherein a receiving hole (22, 66) is formed at least in one of the first base and the second base, and is configured to receive at least a part of the engagement piece projecting from the other of the first base and the second base.

According to this arrangement, the clip is provided with the engagement features that are required to attach two component parts to each other so that the component parts are not required to be provided with engagement features such as through holes and projections. For instance, the back sides of the first base and the second base may be attached to the respective component parts to be connected together by using double-sided tape. In particular, because one of the engagement pieces is partly received in the receiving hole when the two parts are engaged with each other, the overall thickness of the clip can be minimized.

Preferably, the first engagement piece (14, 60) and the second engagement piece (36, 76) are elongated in a first direction, and the second engagement piece opposes the first engagement piece in a second direction perpendicular to the first direction.

Thereby, the two engagement pieces can engage with each over a relatively large surface area.

According to a first aspect of the present invention, the first engagement feature includes a pair of engagement projections (26) projecting from opposite sides of the free end part of the first engagement piece in the second direction, and the second engagement piece includes a pair of second engagement pieces (36) positioned to oppose the first engagement piece in the second direction from opposite sides, each second engagement piece including the second engagement feature that comprises an overhang portion (42) configured to engage the corresponding engagement projection of the first engagement piece in a resilient manner.

Thereby, the first part and the second part are joined by at least two engaged parts, and are therefore joined in a mechanically stable manner.

Preferably, each engagement projection is provided with a slanted upper surface slanting downward toward a free end of the engagement projection, and/or each overhang portion is provided with a slanted upper surface slanting downward toward a free end of the overhang portion.

Thereby, the first part and the second part can be readily joined to each other simply by pushing the first engagement piece into the gap between the two second engagement pieces.

Preferably, the first base includes a pair of stoppers (16) each configured to abut a side of the corresponding second engagement piece facing away from the overhang portion.

The stoppers support the respective second engagement pieces against the pressure from the first engagement piece when the first part and the second part are being joined to each other so that the engagement between the first engagement piece and the second engagement pieces can be effected in a highly reliable manner.

Preferably, each stopper is provided with a first retaining feature (32), and the corresponding second engagement piece is provided with a second retaining feature (44) that cooperates with the first retaining feature to retain the second part relative to the first part against a relative movement in the first direction with a prescribed retaining force.

According to this arrangement, the first part and the second part are firmly retained to each other under normal circumstances, but when the two parts are desired to be separated from each other, the two parts may be slid relatively to each other in the first direction with a force greater than the prescribed retaining force, thereby disengaging the first engagement piece from the second engagement pieces.

The first and the second retaining features may consist of a retaining projection and a retaining recess, or more preferably may consist of a vertical bead and a complementary vertical groove.

According to a second aspect of the present invention, the first engagement piece includes a pair of first engagement pieces (60) spaced apart from each other in the second direction, and the second engagement piece includes a pair of second engagement pieces (76) positioned so as to oppose the respective first engagement pieces in the second direction from different sides, each opposing pair of the first engagement piece and the second engagement piece being provided with a first engagement feature (72) and a second engagement feature (80), respectively, that cooperate with each other, in respective free end parts thereof.

Thereby, the first part and the second part are joined by at least two engaged parts, and are therefore joined in a mechanically stable manner.

Preferably, each first engagement feature includes an engagement projection projecting toward the corresponding second engagement piece, and each second engagement feature includes an overhang portion configured to be resiliently engaged by the corresponding engagement projection, an upper surface of at least one of the engagement projection and the overhang portion is slanted downward toward a free end of the corresponding engagement projection or the overhang portion.

Thereby, the first part and the second part can be readily joined to each other simply by pushing the first engagement pieces onto the corresponding second engagement pieces.

Preferably, the receiving hole extends in the first direction beyond a terminal edge of the engagement piece received by the receiving hole by more than a dimension of the engagement piece in the first direction.

Thereby, the two parts can be slid relative to each other in the first direction until the first engagement pieces and the second engagement pieces are disengaged from each other without the part of the engagement piece received in the receiving hole being caught by an edge of the receiving hole so that the two parts can be conveniently separated from each other for repair and other purposes.

According to a preferred embodiment of the present invention, the first base and the second base define mutually abutting surfaces that retain the first base and the second base at an angle relative to each other.

Thereby, even when two component parts to be joined to each other are not parallel, and at an angle relative to each other, the clip can accommodate the relative angle between the component parts to be joined to each other.

According to a particularly preferred embodiment of the present invention, the first engagement piece and the second engagement piece are each provided with a uniform cross section perpendicular to the first direction.

Thereby, the relative sliding movement between the two parts can be effected in a stable manner so that the two parts can be conveniently separated from each other for repair and other purposes.

The receiving hole may be provided with a bottom wall, but may also consist of a through hole passed through the corresponding base. Thereby, the overall thickness of the clip can be minimized.

The present invention also provides a connecting structure, comprising: the clip defined above; a fender (6) of a motor vehicle having one of the first base and the second base attached thereto; and a garnish (4) having the other of the first base and the second base attached thereto. In this case, the first base and the second base may be attached to the fender and the garnish, respectively, via double-sided tape.

Therefore, the clip according to the present invention does not require a through hole to be formed in one of the two component parts that are to be connected, and may be provided with a small thickness so that the spacing between the two component parts may be minimized.

BRIEF DESCRIPTION OF THE DRAWING(S)

FIG. 5 is a plan view showing the state of engagement of the clip;

DESCRIPTION OF THE PREFERRED EMBODIMENT(S)

Figure 1:
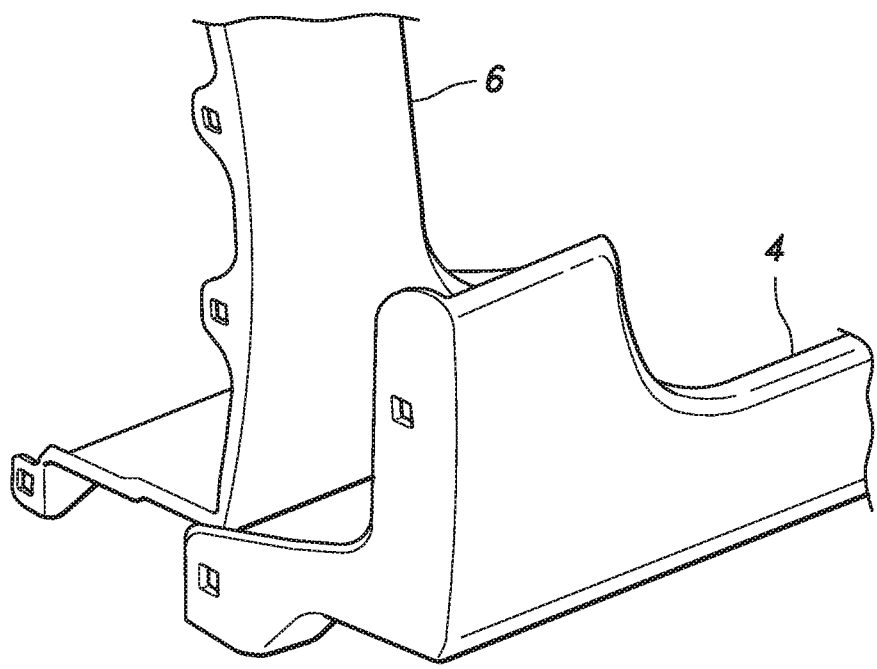
FIG. 1 is a perspective view of a side sill garnish and a front fender of an automobile that are to be connected to each other via a clip according to the present invention.
Figure 2:
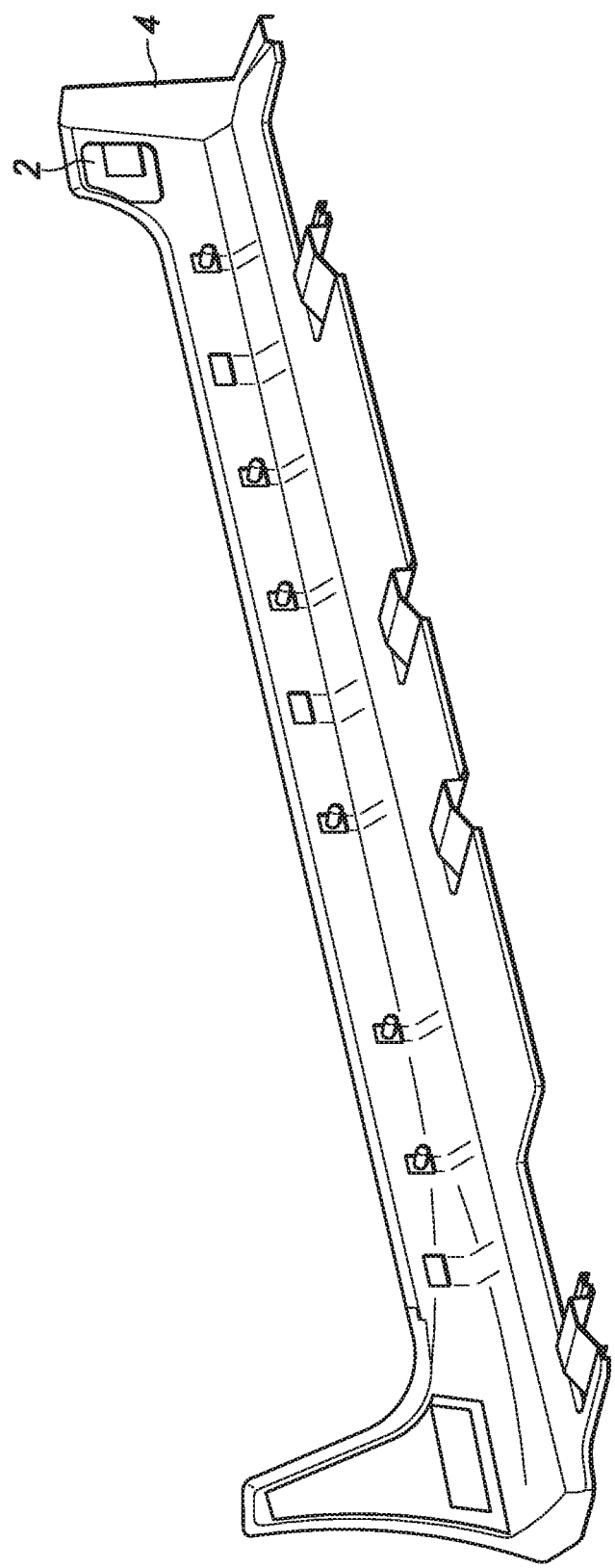
FIG. 2 is a perspective view of the side sill garnish on which the clip is mounted.

A clip 2 given as a first embodiment of the present invention is described in the following with reference to the appended drawings. FIGS. 1 and 2 show a side sill garnish 4 and a front fender 6 of an automobile that are to be connected to each other via the clip 2.

Figure 3:
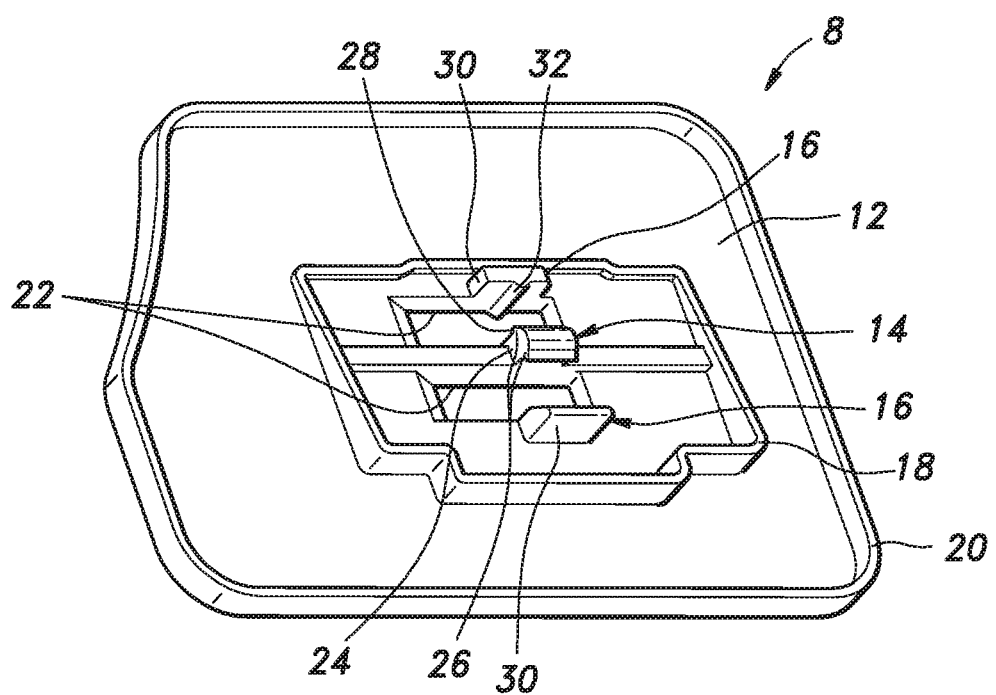
FIG. 3 is a perspective view showing a first part of the clip of the first embodiment.
Figure 4:
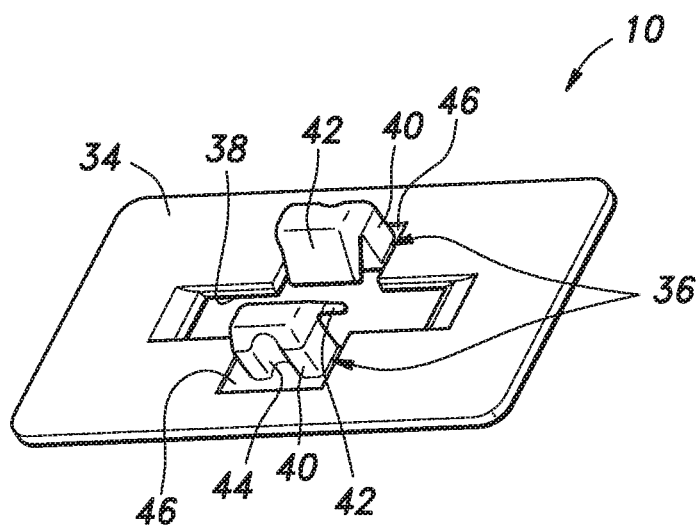
FIG. 4 is a perspective view showing a second part of the clip.
Figure 6A:
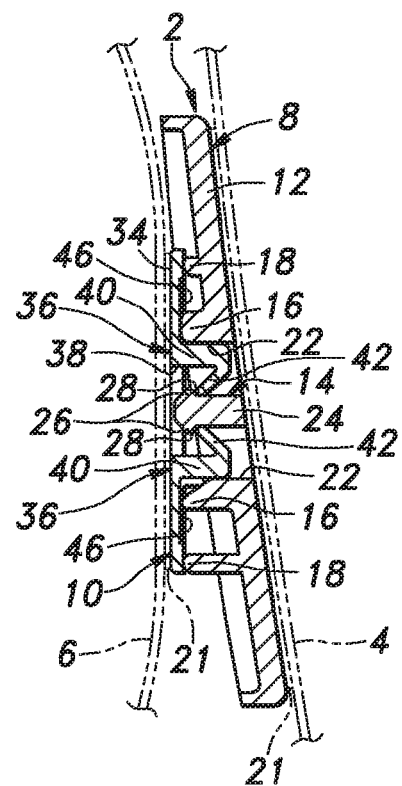
FIG. 6a is a sectional view showing the engaged state of the clip.
Figure 6B:
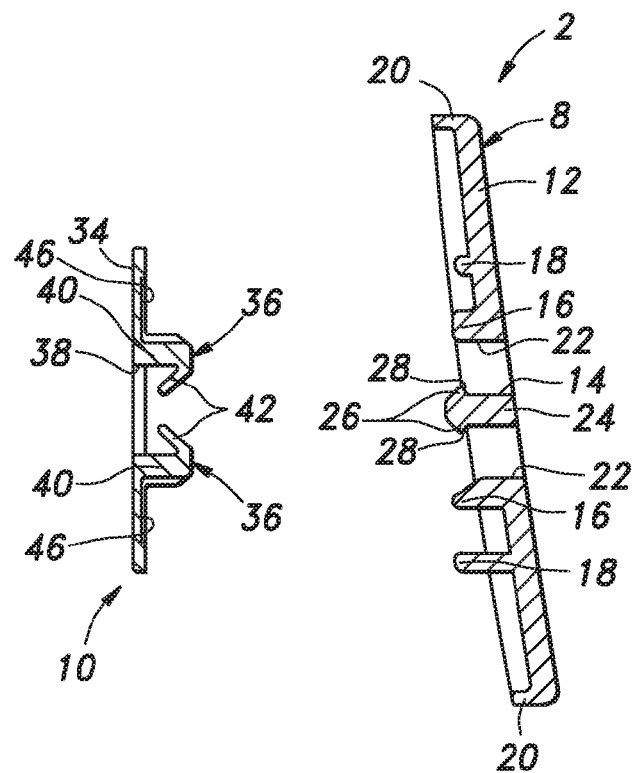
FIG. 6b is a sectional view showing the disengaged state of the clip.

FIGS. 3 to 5 show the configuration of the clip 2, and FIGS. 6a and 6b show the engagement structure of the clip 2. The clip 2 includes a first part 8 configured to be fixed to the side sill garnish 4 and a second part 10 configured to be fixed to the front fender 6. The clip 2 is made by molding plastic material.

The first part 8 includes a plate-shaped first base 12, a first engagement piece 14 projecting from the surface of the first base 12, a pair of stoppers 16 projecting from the surface of the first base 12 on either side of the first engagement piece 14, an annular wall 18 projecting from the surface of the first base 12 and surrounding the first engagement piece 14, and a rim 20 projecting perpendicularly from the peripheral edge of the first base 12. The back side of the first part 8 presents a generally planar back surface. The upper end of the annular wall 18 defines an inclined planar surface.

The first base 12 is provided with a generally rectangular profile in plan view with one corner cut away. The back side of the first base 12 is attached to the side sill garnish 4 by using double-sided tape 21. A rectangular opening (first opening) 22 is passed through the part of the first base 12 located between each stopper 16 and the first engagement piece 14. Each first opening 22 is elongated in a direction (first direction) perpendicular to the direction (second direction) along which the stoppers 16 are aligned, thereby defining short sides and long sides. The short sides of each first opening 22 are defined by inclined surfaces progressively rising away from the first opening 22. The double-sided tape 21 is preferably provided with openings corresponding to the first openings 22 in the first part 8. The particular shape of the profile of the first base 12 is not essential for the present invention, and may be varied as required. If desired, instead of the double-sided tape, other arrangements may be used to attach the first part 8 to the side sill garnish 4. For instance, the side sill garnish 4 may be provided with projections that can be thermally crimped or welded to the first base 12 or a bonding agent may be used. The first openings 22 may also consist of receiving holes having a bottom wall.

The first engagement piece 14 includes a main part 24 projecting from the surface of the first base 12 and a pair of engagement projections 26 projecting laterally (in the second direction) from the free end of the main part 24 away from each other. The first engagement piece 14 is located centrally between the first openings 22, and is offset relative to the first openings 22 in the lengthwise direction (the first direction) of the first openings 22 so that one of the lateral edges of the first engagement piece 14 substantially aligns with the corresponding short sides of the first openings 22. The main part 24 consists of a plate wall extending in the lengthwise direction of the first openings 22 (in the first direction), and the two major surfaces thereof extend continuously with the respective inner side edges of the first openings 22. The width (dimension in the first direction) of the main part 24 is smaller than the length of the first openings 22 so that the other lateral edge of the main part 24 is located inwardly of the other short side edges of the first openings 22. Each engagement projection 26 is provided with a shoulder surface 28 facing downward. The upper side of each engagement projection 26 defines a downwardly sloping surface toward the free end thereof.

Each stopper 16 includes a wall portion 30 projecting vertically from the surface of the first base 12, and aligning with the first engagement piece 14. In other words, each stopper 16 opposes the first engagement piece 14 in the second direction. The inwardly facing surface of the wall portion 30 is formed with a bead 32 or a retaining projection extending vertically and centrally on the wall portion 30. The remaining part of the inwardly facing surface of the wall portion 30 extends continuously to the corresponding edge of the first opening 22, and the bead 32 extends all the way from the free end of the wall portion 30 to the edge of the first opening 22.

The top surface of the annular wall 18 inclines from one side to another in such a manner that the top surface of the annular wall 18 defines a planar inclined surface. This inclination is required to compensate for the fact that the mounting surface of the side sill garnish 4 and the mounting surface of the front fender 6 are not parallel to each other, but at a small angle relative to each other. As will be discussed hereinafter, when the first part 8 and the second part 10 are joined to each other, the top surface of the annular wall 18 evenly engages the planar surface of the second part 10. The first engagement piece 14 and the stoppers 16 project from the first base 12 in a direction perpendicular to the planar surface defined by the top surface of the annular wall 18. Therefore, the first engagement piece 14 and the stoppers 16 project from the first base 12 at a slight angle with respect to the surface of the first base 12. The free ends of the stoppers 16 are substantially flush with the top surface of the annular wall 18, and the free end of the first engagement piece 14 is somewhat higher than the inclined planar surface defined by the top surface of the annular wall 18. The shoulder surface 28 of each engagement projection 26 defines a lower surface substantially in parallel with the planar surface defined by the top surface of the annular wall 18.

The second part 10 includes a plate-shaped second base 34 and a pair of second engagement pieces 36 projecting from the surface of the second base 34.

The second base 34 consists of a rectangular plate, and has a generally smaller outer profile relative to the first base 12, and has a planar back surface which is to be secured to the front fender 6 via double-sided tape 21. A second opening 38 consisting of a through hole is formed centrally in the second base 34 between the two second engagement pieces 36. The second opening 38 is provided with a rectangular shape elongated in a direction (the first direction) perpendicular to the line connecting the two second engagement pieces 36 (and extending in the second direction). The edges of the second opening 38 corresponding to the short sides are defined by inclined surfaces progressively rising away from the second opening 38. The double-sided tape 21 may be formed with an opening conformal to the second opening 38. When the first part 8 and the second part 10 are joined to each other, the long sides of the second opening 38 are in parallel with the long sides of the first opening 22. The shape of the outer profile of the second part 10 is not essential for the present invention, and may be varied as required. The second base 34 may be attached to the front fender 6 by using any per se known modes of attachment such as a bonding agent, instead of the double-sided tape 21. The second opening 38 may also consist of a receiving hole having a bottom wall.

Each second engagement piece 36 includes a main part 40 projecting from the surface of the second base 34 and an overhang portion 42 projecting above the second opening 38. The main part 40 consists of a plate wall extending in the lengthwise direction (the first direction) of the second openings 38, and the inwardly facing major surface thereof defines a part of the edge of the corresponding long side of the second opening 38 in a slightly offset relationship to the remaining part of the long side. Alternatively, the inwardly facing major surface of the main part 40 may be flush with the remaining part of the edge of the corresponding long side of the second opening 38. The main part 40 is located centrally on the edge of the corresponding long side of the second opening 38, and has a width (dimension in the first direction) smaller than the length of the second openings 38 so that the lateral edges of the main part 40 are located inwardly of the short side edges of the openings 38. Each overhang portion 42 consists of a plate-shaped portion extending from the free end part of the main part 40 in the second direction and having a substantially smaller thickness than the main part 40. The upper surface of the overhang portion 42 is slanted downward toward the second opening 38. As will be discussed hereinafter, when the first part 8 and the second part 10 are joined together, the free end of each overhang portion 42 resiliently engages the corresponding engagement projection 26 of the first engagement piece 14. At the same time, the free end of the main part 40 and the base end of the overhang portion 42 of one of the second engagement pieces 36 are received in the corresponding first opening 22.

The outward facing side of the main part 40 of each second engagement piece 36 is formed with a retaining recess 44 consisting of a vertically extending groove which is complementary to the bead 32 formed on the inwardly facing side of the corresponding wall portion 30. When the first part 8 and the second part 10 are joined together, each bead 32 is received in the corresponding retaining recess 44, thereby preventing the relative movement of the first part 8 and the second part 10 in the direction (the first direction) parallel to the long sides of the first openings 22, but when a force exceeding a prescribed value is applied, the engagement between the beads 32 and the recesses 44 may be broken. The part of the second base 34 surrounding the base end of the main part 40 of each second engagement piece 36 is recessed (recess 46) so as to receive the free end of the corresponding stopper 16.

The second part 10 is essentially symmetric with respect to a central line extending (in the first direction) in parallel with the long sides of the second opening 38.

The first openings 22 are preferably at least twice as long as the width of the second engagement pieces 36 that are to be partly received in the respective first openings 22. More preferably, the distance between one of the lateral edges of the first engagement piece 14 and the opposing edge of the first openings 22 (the edge of the corresponding short side thereof) is substantially equal to or greater than the width of the second engagement pieces 36 so that the first part 8 and the second part 10 may be detached by simply sliding the two parts relative to each other in the direction (the first direction) in parallel with the long sides of the first openings 22. The width of each engagement projection 26 of the first engagement piece 14 and the width of the overhang portion 42 are preferably equal to each other, but may also be different from each other.

How the side sill garnish 4 may be attached to and detached from the front fender 6 via the clip 2, as well as the advantages of using the clip 2, is described in the following.

Double-sided tape 21 is applied to the back side of each of the first part 8 and the second part 10 with the peel-off strip kept attached to the opposite side of the tape. The first part 8 and the second part 10 are then pushed against each other so that the free end of the first engagement piece 14 and the free ends of the second engagement pieces 36 abut one another. As the second part 19 has a symmetric configuration, it may be used in either of the two 180 degree apart positions so that an assembling error can be avoided. At this time, owing to the resiliency of the first engagement piece 14 and the second engagement pieces 36, the free end of the first engagement piece 14 can be passed through the gap between the overhang portions 42 of the second engagement pieces 36. Because the overhang portions 42 have a relatively small thickness, the free end of the first engagement piece 14 slides over the inclined surfaces of the overhang portions 42 until the engagement projections 26 clear the free ends of the overhang portions 42 without requiring any undue force. Once the engagement projections 26 clear the free ends of the overhang portions 42, the overhang portions 42 regain the original shape so that the engagement projections 26 and overhang portions 42 positively engage one another. As a result, the first part 8 and the second part 10 are engaged with each other so that the two parts cannot be pulled apart from each other under ordinary circumstances. See FIG. 6a.

At this time, the beads 32 of the stoppers 16 of the first part 8 are engaged by the corresponding retaining recesses 44 so that the relative motion between the first part 8 and the second part 10 in the direction parallel to the long sides of the first openings 22 is prohibited. As the free end of the first engagement piece 14 is received by the second opening 38, and the free ends of the second engagement pieces 36 are received by the corresponding first openings 22 while the free ends of the stoppers 16 are received in the respective recesses 46, the first base 12 and the second base 34 can be brought very close to each other, and the overall thickness of the clip 2 in the engaged state can be minimized.

Then, the peel off strip of the double-sided tape 21 applied to the first part 8 is removed, and the first part 8 is attached to a prescribed position on the side sill garnish 4. Thereafter, the peel off strip of the double-sided tape 21 applied to the second part 10 is removed, and the side sill garnish 4 is pushed against a prescribed position on the front fender 6 so that the second part 10 is bonded to the front fender 6. Thereby, the side sill garnish 4 is fixedly attached to the front fender 6 via the clip 2.

Because the clip 2 is attached to the front fender 6 via the double-sided tape 21, no hole is required to be formed in the front fender 6. The clip 2 is so thin that the space between the side sill garnish 4 and the front fender 6 can be minimized.

When the side sill garnish 4 is required to be removed from the front fender 6 for repair or maintenance purposes, the side sill garnish 4 is slid laterally in the direction of the long sides of the first openings 22 and the second opening 38 (or in the first direction). If a certain force is used in this case, the engagement between the beads 32 of the stoppers 16 of the first part 8 and the retaining recesses 44 of the second engagement pieces 36 of the second part 10 can be released from one another owing to the resiliency of the stoppers 16 and the second engagement pieces 36 so that the second part 10 can be slid laterally with respect to the first part 8. As a result, the contact area between the engagement projections 26 of the first engagement piece 14 and the overhang portions 42 of the second engagement pieces 36 diminishes. Therefore, when the second part 10 is slid laterally with respect to the first part 8 by an adequate stroke, the engagement between the engagement projections 26 and the overhang portions 42 is completely resolved so that the first part 8 and the second part 10 are disengaged from each other. Therefore, the side sill garnish 4 can be removed from the front fender 6 without damaging the first part 8 or the second part 10 and without requiring the double-sided tape 21 to be removed.

When the side sill garnish 4 is to be attached to the front fender 6 once again, it can be accomplished simply by positioning the side sill garnish 4 on the prescribed position on the front fender 6 and pushing the side sill garnish 4 onto the front fender 6. Thereby, the first part 8 and the second part 10 are resilient engaged with each other once again, and the side sill garnish 4 is attached to the front fender 6 via the clip 2. Thus, according to the illustrated embodiment, the side sill garnish 4 can be easily attached to the front fender 6 via the clip 2 in a highly secure manner, but can be readily detached from each other without requiring any special tool. Furthermore, even after the side sill garnish 4 is detached from the front fender 6, it is also possible to reattach the side sill garnish 4 to the front fender 6 via the clip 2 in a simple manner without damaging the clip 2. Therefore, not only the assembly work is simplified but also the repair and maintenance work is simplified.

As can be appreciated from the foregoing, the second part 10 is rotationally symmetric by 180 degrees, and the second engagement pieces 36 are positioned centrally one the long sides of the opening 38. Furthermore, because the second opening 38 extends by a length equal to or slightly greater than the width of the second engagement pieces 36 beyond either side edge of the second engagement pieces 36 (or the second opening 38 has a length equal to or greater than three times the width of the second engagement pieces 36), the second part 10 may be attached to the front fender 6 in either of the two 180 degrees apart positions in a detachable manner as discussed above.

A clip 52 of the second embodiment of the present invention is described in the following.

Figure 7:
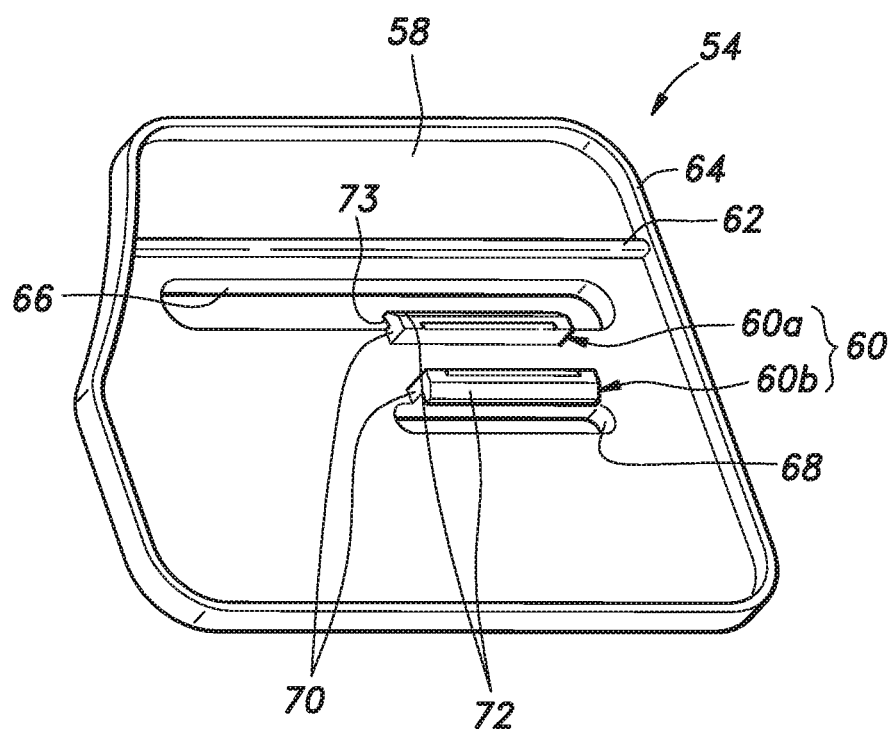
FIG. 7 is a perspective view showing a first part of the clip of the second embodiment.
Figure 8:
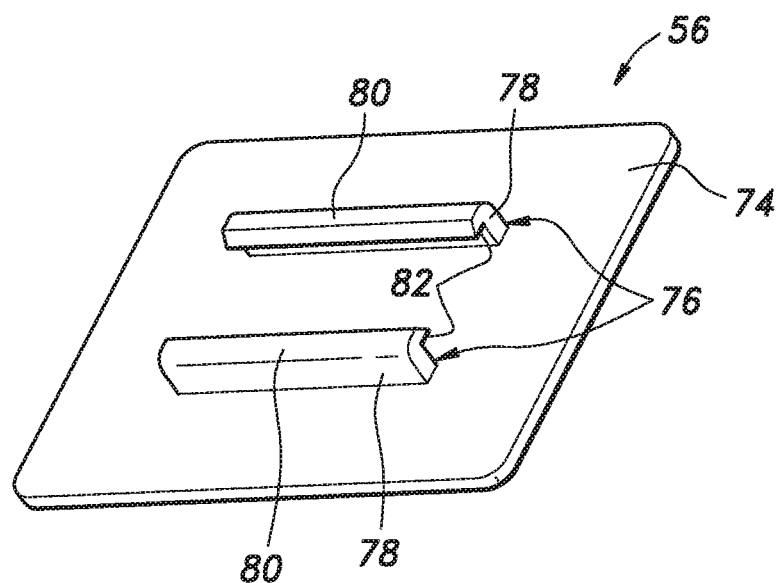
FIG. 8 is a perspective view showing a second part of the clip.
Figure 9:
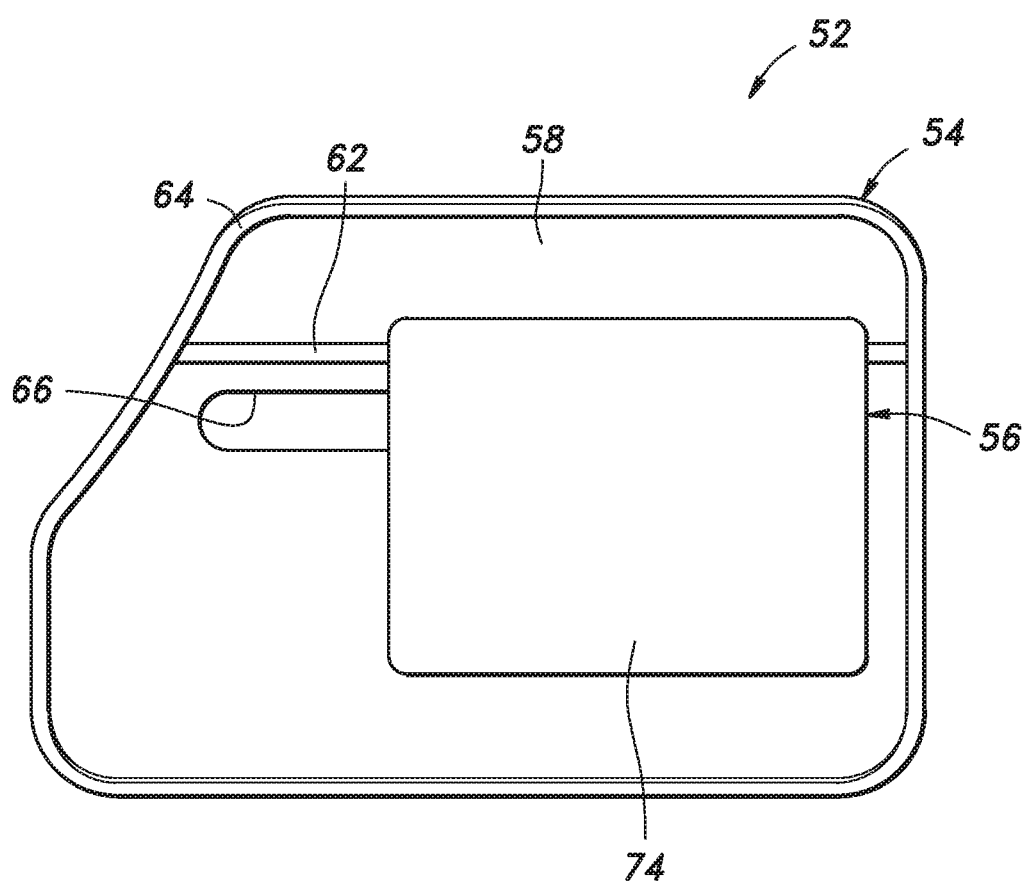
FIG. 9 is a plan view showing the engaged state of the clip.
Figure 10A:
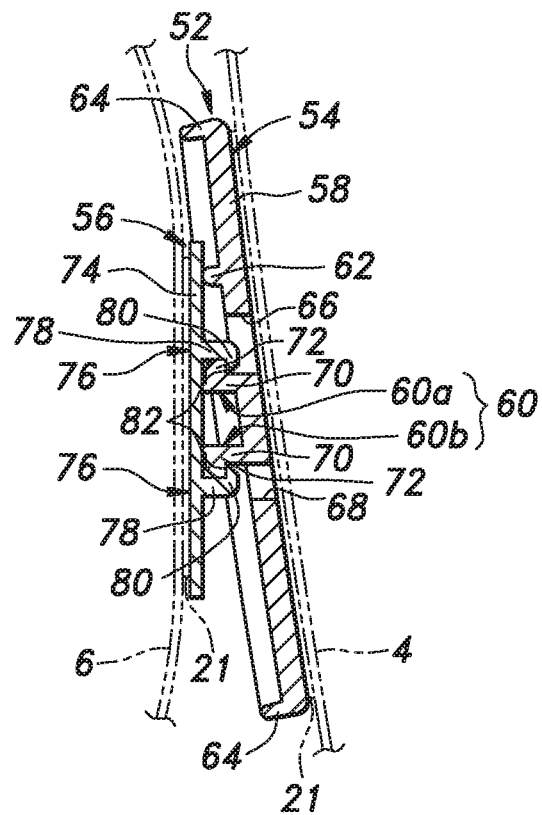
FIG. 10a is a sectional view showing the engaged state of the clip.
Figure 10B:
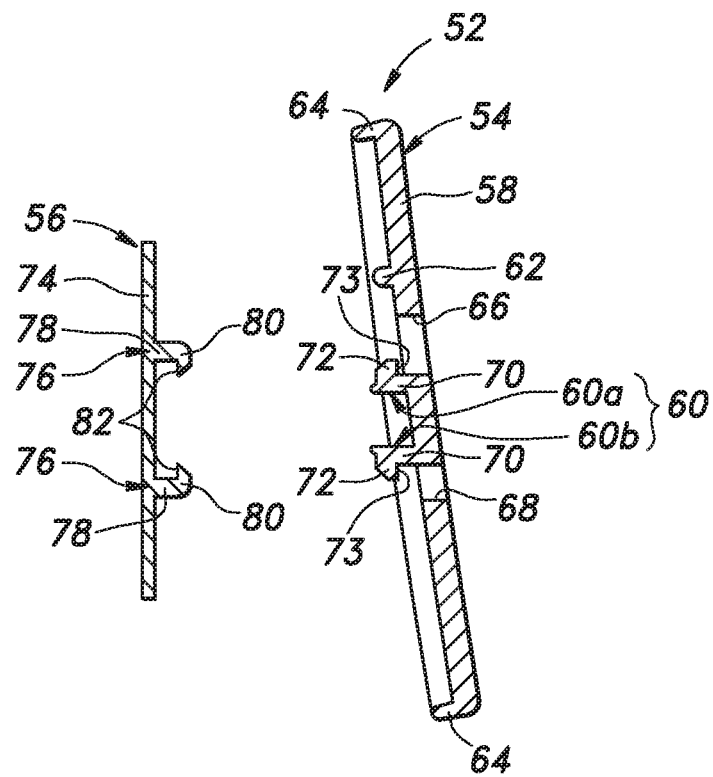
FIG. 10b is a sectional view showing the disengaged state of the clip.

FIGS. 7 to 9 show the configuration of the clip 52, and FIGS. 10a and 10b show the engagement structure of the clip 52. The clip 52 includes a first part 54 configured to be fixed to the side sill garnish 4 and a second part 56 configured to be fixed to the front fender 6. The clip 52 is made by molding plastic material.

The first part 54 includes a plate-shaped first base 58, a pair of first engagement pieces 60 projecting from the surface of the first base 58, a rim 64 projecting perpendicularly from the peripheral edge of the first base 58 and an abutting wall 62 extending between the opposing parts of the rim 64.

The first base 58 is provided with a generally rectangular profile in plan view with one corner cut away. The back side of the first base 58 is attached to the side sill garnish 4 by using double-sided tape 21. The particular shape of the profile of the first base 58 is not essential for the present invention, and may be varied as required. If desired, instead of the double-side tape, other arrangements may be used to attach the first part to the side sill garnish 4. For instance, the side sill garnish 4 may be provided with projections that are inserted in holes formed in the first base 58, and thermally crimped or welded to the first base 58, or a bonding agent may be used.

A large opening 66 elongated in the direction (the first direction) parallel to the abutting wall 62 and passed through the first base 58 is formed adjacent to the abutting wall 62. A small opening 68 elongated in the direction parallel to the abutting wall 62 and passed through the first base 58 is provided on the other side of the large opening 66 from the abutting wall 62. The large opening 66 is substantially longer (in the first direction) than the small opening 68. In the illustrated embodiment, each of these openings is defined by a pair of linear edges extending in parallel with the abutting wall 62 (in the first direction), and a pair of arcuate edges connecting the corresponding linear edges (in the second direction). In particular, an end of one of the first engagement pieces 60a inwardly adjoins an end of the large opening 66, and aligns with the corresponding end of the other first engagement piece 66b. Furthermore, the large opening 66 extends beyond the other end of the one first engagement piece 60a by a distance equal to or greater than the length of the other first engagement piece 60b. The openings 66 and 68 may also consist of receiving holes having a bottom wall. The double-sided tape 21 may be formed with an opening or openings conformal to the large opening 66 and/or the small opening 68.

One of the first engagement pieces 60a is located on the edge of the large opening 66 facing away from the abutting wall 62, and extends along this edge. The other first engagement piece 60b extends in parallel with the one engagement piece 60a along the edge of the small opening 68 adjoining the one engagement piece 60a. The engagement pieces 60 have a same length which is equal to or slightly smaller than the length of the small opening 68.

Each first engagement piece 60 includes a main part 70 projecting from the surface of the first base 58 and an engagement projection 72 projecting from the free end of the main part 70 away from the other first engagement piece 60. The main part 70 is plate-shaped, and extends in parallel with the abutting wall 62. The side of the main part 70 facing the other first engagement piece 60 defines a planar surface extending continuously with the edge of the corresponding opening. Therefore, the engagement projection 72 overhangs the corresponding opening, and defines a downwardly facing shoulder surface 73 substantially in parallel with the surface of the first base 58.

The one first engagement piece 66a adjoining the abutting wall 62 is slightly lower than the other first engagement piece 66b with respect to the surface of the first base 58. Also, the two shoulder surfaces 73 of the two first engagement pieces 60 have different heights with respect to the surface of the first base 58 in a corresponding manner.

The second part 56 includes a plate-shaped second base 74 and a pair of second engagement pieces 76 projecting from the surface of the second base 74.

The second base 74 consists of a rectangular plate, and has a generally smaller outer profile relative to the first base 58, and has a planar back surface which is to be secured to the front fender 6 via double-sided tape 21. The shape of the outer profile of the second base 74 is not essential for the present invention, and may be varied as required. The second base 74 may also be attached to the front fender 6 by using any per se known modes of attachment such as a bonding agent, instead of the double-sided tape 21.

Each second engagement piece 76 includes a main part 78 projecting from the surface of the second base 74 and an overhang portion 80 projecting toward the other second engagement piece 76. The main part 78 consists of a plate wall extending in the direction parallel to the main parts 70 of the first engagement pieces 60 when the first part 54 and the second part 56 are joined to each other. Each overhang portion 80 consists of a plate-shaped portion extending from the free end of the main part 78 toward the other second engagement piece 76 so as to define a downwardly facing shoulder surface 82. The upper surface of each overhang portion 80 consists of a plane with a downward slope toward the free end of the overhang portion 80. The two second engagement pieces 76 are symmetric to each other about a center line in parallel with the second engagement pieces 76.

When the first part 54 and the second part 56 are pushed against each other so that the free ends of the first engagement pieces 60 squarely abut the free ends of the respective second engagement pieces 76, owing to the presence of the downward slope on the upper surfaces of the overhang portions 80 and the resiliency of the first engagement pieces 60 and the second engagement pieces 76, the engagement projections 72 clear the respective overhang portions 80, and the shoulder surfaces 73 of the first engagement pieces 60 engage the shoulder surfaces 82 of the second engagement pieces 76, respectively. At this time, one of the second engagement pieces 76 is at least partly received in the large opening 66 and the other second engagement piece 76 is slightly spaced away from the small opening 68. Therefore, when the first part 54 and the second part 56 are coupled with each other, the first base 58 and the second base 74 are not in parallel to each other, but at a slight angle relative to each other. When the first part 54 and the second part 56 are coupled with each other, the free end of the abutting wall 62 evenly abuts the surface of the second base 74.

When the first part 54 and the second part 56 are to be disconnected from each other, the first part 54 and the second part 56 are slid relative to each other in the direction (the first direction) parallel to the abutting wall 62 such that the one of the second engagement pieces 76 is passed in and along the large opening 66 while the other second engagement piece 76 is passed along the small opening 68 (without entering the small opening 68) and the surface of the first base 58. Therefore, the large opening 66 is desired to be at least twice as long as the width of the main part 70 of the corresponding first engagement piece 60a.

How the side sill garnish 4 may be attached to and detached from the front fender 6 via the clip 52, as well as the advantages of using the clip 52, is described in the following.

When the first part 54 and the second part 56 are joined to each other, the mutually slanted relative position of the first part 54 and the second part 56 is determined by the engagement of the first engagement pieces 60 and the second engagement pieces 76 and the abutment of the abutting wall 62 of the first part 54 onto the second base 74 of the second part 56. Owing to the frictional forces created by the engagement and the abutment, the first part 54 and the second part 56 are prevented from moving in the direction of the extension of the abutting wall 62 relative to each other. Because the free end of one of the second engagement pieces 76 is received by the large opening 66, the thickness of the clip 52 in the engaged state can be minimized, and the first base 58 and the second base 74 can be brought closer together than is otherwise possible. Similarly as in the first embodiment, because the clip 52 is attached to the front fender 6 by using the double-sided tape 21, no through hole is required to be formed in the front fender 6. Also, the clip 52 is so thin that the space between the side sill garnish 4 and the front fender 6 can be minimized.

When the side sill garnish 4 is desired to be removed from the front fender 6, the side sill garnish 4 is slid in the direction (first direction) of the abutting wall 62 so that the first engagement pieces 60 are disengaged from the respective second engagement pieces 76.

The second embodiment provides similar advantages as the first embodiment.

The present invention has been described in terms of specific embodiments, but may be modified in various ways without departing from the spirit of the present invention. For instance, instead of providing the engagement projections 26 of the first engagement piece 14 for defining the shoulder surfaces 28 in the first embodiment, a groove extending in the first direction may be provided on each major surface of the main part 24 of the first engagement piece 14 so that the shoulder surface may be defined by the groove. It is also possible to combine at least one of the features of one of the embodiments with the other embodiment, or to substitute at least one of the features of one of the embodiments with that or those of the other embodiment. The component parts or members that can be attached to each other via the clip of the present invention are not limited to the side sill garnish 4 and the front fender 6, but the clip of the present invention can be used for attaching two component parts of any other kinds.

The invention claimed is:

1. A clip, comprising;
   a first part including a plate-shaped first base and a first engagement piece projecting from a surface of the first base, a free end part of the first engagement piece being formed with a first engagement feature; and
   a second part including a plate-shaped second base and a second engagement piece projecting from a surface of the second base, a free end part of the second engagement piece being formed with a second engagement feature configured to cooperate with the first engagement feature;
   wherein a receiving hole is formed at least in one of the first base and the second base, and is configured to receive at least a part of the engagement piece projecting from the other of the first base and the second base;
   wherein the first engagement piece and the second engagement piece are elongated in a first direction, and the second engagement piece opposes the first engagement piece in a second direction perpendicular to the first direction; and
   wherein the first engagement feature includes a pair of engagement projections projecting from opposite sides of the free end part of the first engagement piece in the second direction, and the second engagement piece comprises a pair of second engagement pieces positioned to oppose the first engagement piece in the second direction from opposite sides, each second engagement piece including the second engagement feature that comprises an overhang portion configured to engage the corresponding engagement projection of the first engagement piece in a resilient manner.

2. The clip according to claim 1, wherein each engagement projection is provided with a slanted upper surface slanting downward toward a free end of the engagement projection.

3. The clip according to claim 1, wherein each overhang portion is provided with a slanted upper surface slanting downward toward a free end of the overhang portion.

4. The clip according to claim 1, wherein the first base includes a pair of stoppers each configured to abut a side of the corresponding second engagement piece facing away from the overhang portion.

5. The clip according to claim 4, wherein each stopper is provided with a first retaining feature, and the corresponding second engagement piece is provided with a second retaining feature that cooperates with the first retaining feature to retain the second part relative to the first part against a relative movement in the first direction with a prescribed retaining force.

6. The clip according to claim 5, wherein one of the first retaining feature and the second retaining feature includes a retaining projection, and the other of the first retaining feature and the second retaining feature includes a retaining recess resiliently receiving the retaining projection.

7. The clip according to claim 6, wherein the retaining projection includes a vertical bead, and the retaining recess includes a vertical groove complementary to the vertical bead.

8. The clip according to claim 1, wherein the first engagement piece comprises a pair of first engagement pieces spaced apart from each other in the second direction, and the pair of second engagement pieces are positioned so as to oppose the respective first engagement pieces in the second direction from different sides, each opposing pair of the first engagement piece and the second engagement piece being provided with the first engagement feature and the second engagement feature, respectively, that cooperate with each other, in respective free end parts thereof.

9. The clip according to claim 8, wherein an upper surface of at least one of the engagement projections and the overhang portions is slanted downward toward a free end thereof.

10. The clip according to claim 1, wherein the receiving hole extends in the first direction beyond a terminal edge of the engagement piece received by the receiving hole by more than a dimension of the engagement piece in the first direction.

11. The clip according to claim 1, wherein the first base and the second base define mutually abutting surfaces that retain the first base and the second base at an angle relative to each other.

12. The clip according to claim 1, wherein the first engagement piece and the second engagement piece are each provided with a uniform cross section perpendicular to the first direction.

13. A connecting structure, comprising:
   the clip according to claim 1;
   a fender of a motor vehicle having one of the first base and the second base attached thereto; and
   a garnish having the other of the first base and the second base attached thereto.

14. The connecting structure according to claim 13, wherein the first base and the second base are attached to the fender and the garnish, respectively, via double-sided tape.

* * * * *